United States Patent
Nakatsuka

(10) Patent No.: US 8,184,329 B2
(45) Date of Patent: May 22, 2012

(54) PRINT PROCESSING EXECUTION APPARATUS, HISTORY INFORMATION PROCESSING METHOD, PROGRAM, AND RECORDING MEDIUM

(75) Inventor: Tadanori Nakatsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 904 days.

(21) Appl. No.: 12/036,923

(22) Filed: Feb. 25, 2008

(65) Prior Publication Data

US 2008/0204807 A1     Aug. 28, 2008

(30) Foreign Application Priority Data

Feb. 26, 2007  (JP) ................. 2007-045521

(51) Int. Cl.
| | |
|---|---|
| G06K 15/00 | (2006.01) |
| H04N 1/00 | (2006.01) |
| H04N 1/46 | (2006.01) |
| G03F 3/08 | (2006.01) |
| G06F 7/00 | (2006.01) |

(52) U.S. Cl. ....... 358/1.16; 358/400; 358/505; 358/508; 358/523; 707/768; 707/721

(58) Field of Classification Search ................. 358/1.16, 358/1.15, 505, 508, 523, 400, 405, 426.05, 358/474; 726/1, 14, 32; 707/768, 721; 705/14.53, 705/14.25

See application file for complete search history.

(56) References Cited

U.S. PATENT DOCUMENTS

2004/0141203 A1 *  7/2004  Honma .............. 358/1.15
2006/0153617 A1 *  7/2006  Shoji et al. ............. 400/62

FOREIGN PATENT DOCUMENTS

| CN | 1517851 A | 8/2004 |
|---|---|---|
| EP | 0867805 B1 * | 12/1998 |
| JP | 11134136 A | 5/1999 |
| JP | 2006178939 A | 7/2006 |
| JP | 2006-236269 A | 9/2006 |
| JP | 2006-259846 A | 9/2006 |

OTHER PUBLICATIONS

"Solve Simple Questions of Windows NT!!" NT Q&A No. 25, Windows NT World, vol. 4, No. 6, Japan, IDG Japan, Jun. 10, 1999, p. 145-148.

* cited by examiner

*Primary Examiner* — Benny Q Tieu
*Assistant Examiner* — Ngon Nguyen
(74) *Attorney, Agent, or Firm* — Canon USA, Inc., IP Division

(57) ABSTRACT

A print processing execution apparatus includes a restriction information acquisition unit configured to acquire restriction information including processing information, a print processing execution unit configured to execute print processing based on a job, a determination unit configured to determine whether a condition for storing history information related to the job is satisfied, a storage control unit configured to store the history information in a storage unit if the determination unit determines that the condition for storing history information is satisfied, and a processing unit configured to execute processing based on the processing information included in the restriction information if the determination unit determines that the condition for storing history information is not satisfied.

11 Claims, 20 Drawing Sheets

FIG.3

ACT (RESTRICTION INFORMATION):

ID
   012345

PRINT RESTRICTION
   PERMIT COLOR-PRINTING
   DENY SIMPLEX-PRINTING

ACT (RESTRICTION INFORMATION):

ID
   012345

PRINT RESTRICTION
   PERMIT COLOR-PRINTING
   DENY SIMPLEX-PRINTING

HISTORY INFORMATION STORING RESTRICTION
   IF PRINT DATA INCLUDES CHARACTER STRING "SCHEDULE", STORE HISTORY INFORMATION

HISTORY INFORMATION STORING IMPOSSIBLE-TIME RESTRICTION
   IF IT IS IMPOSSIBLE TO STORE HISTORY INFORMATION, DENY PRINTING

ACT (RESTRICTION INFORMATION):

ID
　012345

PRINT RESTRICTION
　PERMIT COLOR-PRINTING
　DENY SIMPLEX-PRINTING

HISTORY INFORMATION STORING RESTRICTION
　IF USING TRAY 1, STORE HISTORY INFORMATION

HISTORY INFORMATION STORING IMPOSSIBLE-TIME RESTRICTION
　IF IT IS IMPOSSIBLE TO STORE HISTORY INFORMATION, DENY PRINTING

ACT (RESTRICTION INFORMATION):

ID
    012345

PRINT RESTRICTION
    PERMIT COLOR-PRINTING
    DENY SIMPLEX-PRINTING

HISTORY INFORMATION STORING RESTRICTION
    IF USING TRAY 1 & COLOR-PRINTING,
    STORE HISTORY INFORMATION

HISTORY INFORMATION STORING
IMPOSSIBLE-TIME RESTRICTION
    IF IT IS IMPOSSIBLE TO STORE HISTORY
    INFORMATION, DENY PRINTING

ACT (RESTRICTION INFORMATION):

DEPARTMENT ID
    1111

PRINT RESTRICTION
    PERMIT COLOR-PRINTING
    DENY SIMPLEX-PRINTING

HISTORY INFORMATION STORING RESTRICTION
    IF PRINT DATA INCLUDES IMAGE OR GRAPHICS, STORE HISTORY INFORMATION

HISTORY INFORMATION STORING IMPOSSIBLE-TIME RESTRICTION
    IF IT IS IMPOSSIBLE TO STORE HISTORY INFORMATION, DENY PRINTING

```xml
<?xml version="1.0" encoding="UTF-8"?>
<ACT xmlns:xsi="http://www.w3.org/2001/XMLSchema-instance">
 <Version>0</Version>
 <UserInfo>
   <UserName>012345</UserName>
   <UserEmail>012345@xxx.yyy</UserEmail>
 </UserInfo>
 <DeviceInfo>
   <PrintSecurityLevel>0</PrintsecurityLevel>
 </DeviceInfo>
 <DeviceAccessControl>
   <AttributeCategory Name="DeviceCapabilityRestriction" CategoryStatus="Static">
     <saml:AttributeStatement>
       <saml:Attribute Name="PdlPrint">
         <saml:AttributeValue Name="PdlPrintFlag">Permit</saml:AttributeValue>
         <saml:AttributeValue Name="ColorPrint">Color</saml:AttributeValue>
         <saml:AttributeValue Name="Simplex">Deny</saml:AttributeValue>
       <saml:Attribute>
     </saml:AttributeStatement>
   </AttributeCategory>
   <AttributeCategory Name="JobArchiveRestriction" CategoryStatus="Static">
     <saml:AttributeStatement>
       <saml:Attribute Name="JobArchive">
         <saml:AttributeValue Name="IncludedSentence">Schedule</saml:AttributeValue>
         <saml:AttributeValue Name="ImpossibleState">PrintDeny</saml:AttributeValue>
       <saml:Attribute>
     </saml:AttributeStatement>
   </AttributeCategory>
 <DeviceAccessControl>
</ACT>
```

FIG.16

ACT:

ID
   012345

PRINT RESTRICTION
   PERMIT COLOR-PRINTING
   DENY SIMPLEX-PRINTING

HISTORY INFORMATION STORING RESTRICTION
   IF PRINT DATA INCLUDES CHARACTER STRING "SCHEDULE", STORE HISTORY INFORMATION

HISTORY INFORMATION STORING IMPOSSIBLE-TIME RESTRICTION IN STEP 1
   REDUCE FILE SIZE BY SHARING DRAWING OBJECT DETECTED ACCORDING TO STORED HISTORY INFORMATION

HISTORY INFORMATION STORING IMPOSSIBLE-TIME RESTRICTION IN STEP 2
   REDUCE FILE SIZE BY CHANGING MULTICOLOR REPRESENTATION OF DRAWING OBJECT DETECTED ACCORDING TO STORED HISTORY INFORMATION TO MONOCHROMATIC REPRESENTATION THEREOF

HISTORY INFORMATION STORING IMPOSSIBLE-TIME RESTRICTION IN LAST STEP (FINAL MEASURE)
   DENY PRINTING

EXAMPLE OF HISTORY INFORMATION STORING
IMPOSSIBLE-TIME RESTRICTION IN STEP 1
(REDUCTION IN FILE SIZE BY SHARING DRAWING OBJECT
DETECTED ACCORDING TO ALREADY STORED HISTORY INFORMATION)

EXAMPLE OF HISTORY INFORMATION STORING
IMPOSSIBLE-TIME RESTRICTION IN STEP 2
(REDUCTION IN FILE SIZE BY CHANGING MULTICOLOR REPRESENTATION
OF DRAWING OBJECT DETECTED ACCORDING TO STORED HISTORY
INFORMATION TO MONOCHROMATIC REPRESENTATION THEREOF)

FIG.19

ACT:

ID
  012345

PRINT RESTRICTION
  PERMIT COLOR-PRINTING
  DENY SIMPLEX-PRINTING

HISTORY INFORMATION STORING RESTRICTION
  IF PRINT DATA INCLUDES CHARACTER STRING "SCHEDULE", STORE HISTORY INFORMATION

HISTORY INFORMATION STORING IMPOSSIBLE-TIME RESTRICTION IN STEP 1
  REDUCE FILE SIZE BY SHARING DRAWING OBJECT DETECTED ACCORDING TO NEW HISTORY INFORMATION

HISTORY INFORMATION STORING IMPOSSIBLE-TIME RESTRICTION IN LAST STEP (FINAL MEASURE)
  DENY PRINTING

PRINT PROCESSING EXECUTION APPARATUS, HISTORY INFORMATION PROCESSING METHOD, PROGRAM, AND RECORDING MEDIUM

BACKGROUND OF THE INVENTION

1. Field of the Invention

The present invention relates to a print processing execution apparatus, a history information processing method, a program, and a recording medium.

2. Description of the Related Art

Some print systems store information specifying printed data or printed thumbnail data as history information, together with job information, in order to prevent information leakage and to perform job tracking. Japanese Patent Application Laid-Open No. 2006-178939 discusses one such print system, which has a job tracking function provided in a printer driver and includes an extracting unit configured to extract job-tracking function history information, thereby enabling setting what information the print system stores and how the print system stores such information.

Japanese Patent Application Laid-Open No. 11-134136 discusses a print system configured to limit available information processing functions corresponding to identification information identifying each individual user to prevent information leakage and as to reduce clerical cost.

SUMMARY OF THE INVENTION

According to an aspect of the present invention, a print processing execution apparatus includes a restriction information acquisition unit configured to acquire restriction information including processing information, a print processing execution unit configured to execute print processing based on a job, a determination unit configured to determine whether a condition for storing history information related to the job is satisfied, a storage control unit configured to store the history information in a storage unit if the determination unit determines that the condition for storing history information is satisfied, and a processing unit configured to execute processing based on the processing information if the determination unit determines that the condition for storing history information is not satisfied.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates a conventional access control template (ACT).

FIG. 4 illustrates an exemplary ACT according to a first exemplary embodiment of the present invention.

FIG. 5A illustrates another exemplary ACT according to the first exemplary embodiment of the present invention or to a second exemplary embodiment of the present invention.

FIG. 5B illustrates still another exemplary ACT according to the first exemplary embodiment of the present invention.

FIG. 6 illustrates yet another exemplary ACT according to the first exemplary embodiment of the present invention.

FIG. 8 illustrates an exemplary ACT described in an Extensible Markup Language (XML) form.

FIG. 16 illustrates an exemplary ACT according to a fourth exemplary embodiment of the present invention.

FIG. 19 illustrates an exemplary ACT according to a fifth exemplary embodiment of the present invention.

DETAILED DESCRIPTION OF THE EMBODIMENTS

Various exemplary embodiments, features, and aspects of the invention will be described in detail below with reference to the drawings.

Figure 1:
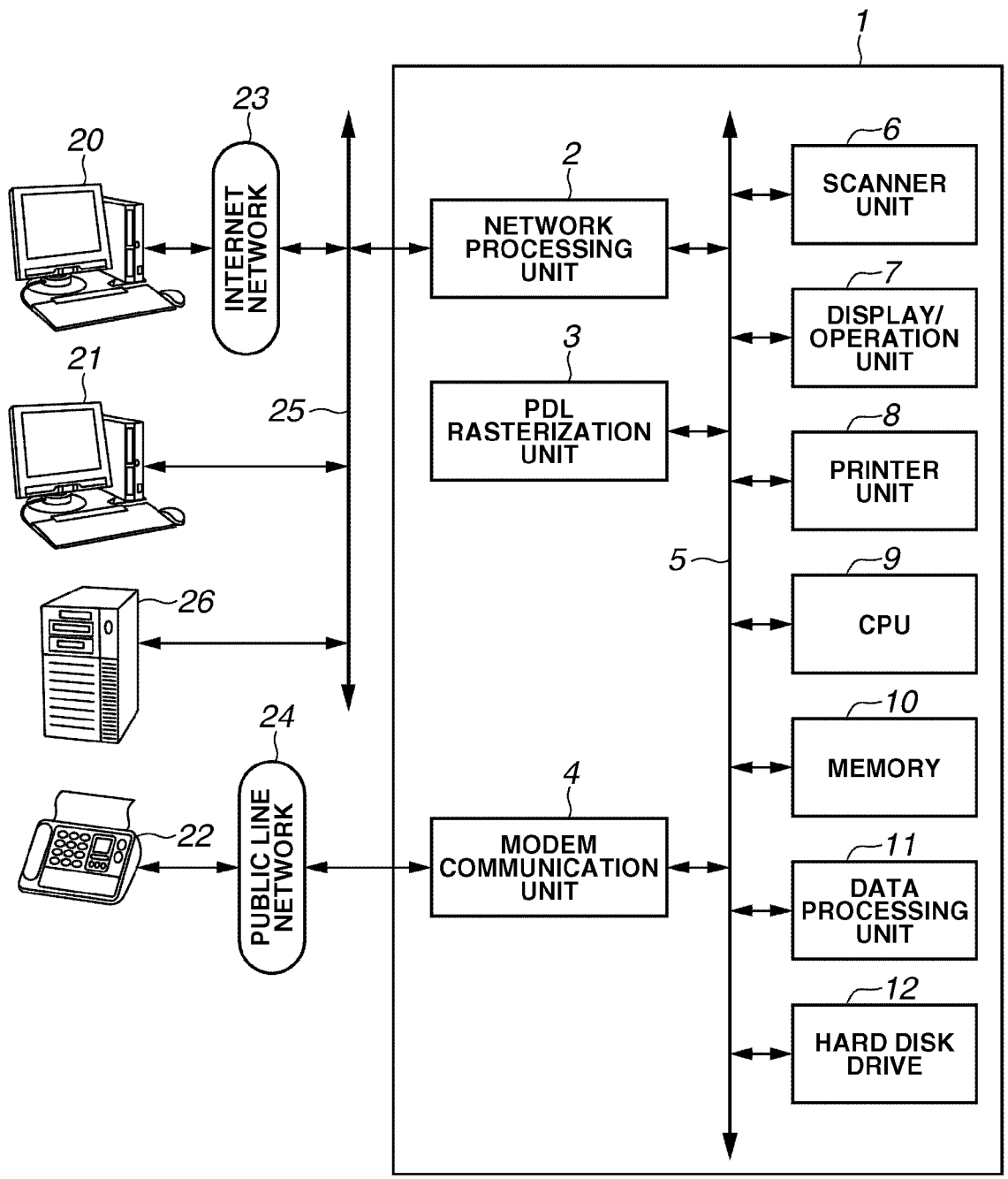
FIG. 1 illustrates an exemplary configuration of a print system according to an exemplary embodiment of the present invention and, more particularly, illustrates that of hardware of a copying machine of the print system.

FIG. 1 illustrates an exemplary configuration of a print system according to first exemplary embodiment of the present invention and, more particularly, illustrates the hardware of a copying machine of the print system. The print system includes a copying machine 1 serving as an exemplary print processing execution apparatus, computers 20 and 21, a history information management server 26, and a facsimile apparatus (FAX) 22.

The copying machine 1 is connected to the computer 21 and the history information management server 26 via a network 25. The copying machine 1 is connected to the computer 20 via the network 25 and an Internet network 23. The copying machine 1 is connected to the FAX 22 via a public line network 24.

The copying machine 1 includes a network processing unit 2, a page description language (PDL) rasterization unit 3, a modem communication unit 4, a scanner unit 6, a display/operation unit 7, a printer unit 8, a central processing unit (CPU) 9, and a memory 10. The copying machine 1 further includes a data processing unit 11 and a hard disk drive 12. These hardware components are connected to one another via an internal bus 5.

The network processing unit 2 controls data exchange between the computer 21, which is connected to the copying machine 1 via the network 25, and each of the other hardware components of the copying machine 1 and between the computer 20, which is connected to the copying machine 1 via the Internet network 23 and the network 25, and each of the hardware components other than the network processing unit 2 of the copying machine 1.

The PDL rasterization unit 3 rasterizes PDL data sent from the computer 20, 21 into a print image (print data). The rasterized print image is transferred to the printer unit 8 via the internal bus 5 by the CPU 9. The printer unit 8 performs printing using the print image transferred thereto.

The modem communication unit 4 controls data exchange between the copying machine 1 and the FAX 22 connected thereto via the public line network 24.

The scanner unit 6 reads a document set on the copying machine 1. Image data read from the document is transferred to the data processing unit 11 via the internal bus 5 by the CPU 9. The data processing unit 11 performs image processing, such as a rotation and a magnification variation, on the image data transferred thereto. An image (image data) obtained as a result of the image processing is stored in the memory 10. Subsequently, the CPU 9 sends the image stored in the memory 10 to the external computers 20 and 21 connected to the network 25 and prints the image stored in the memory 10 using the printer unit 8 in response to an operation input by a user via the display/operation unit 7.

The display/operation unit 7 is a liquid crystal display device having a built-in touch panel. The display/operation unit 7 displays a status of an application program on the touch panel and receives a signal generated by a user's input operation.

Figure 2:
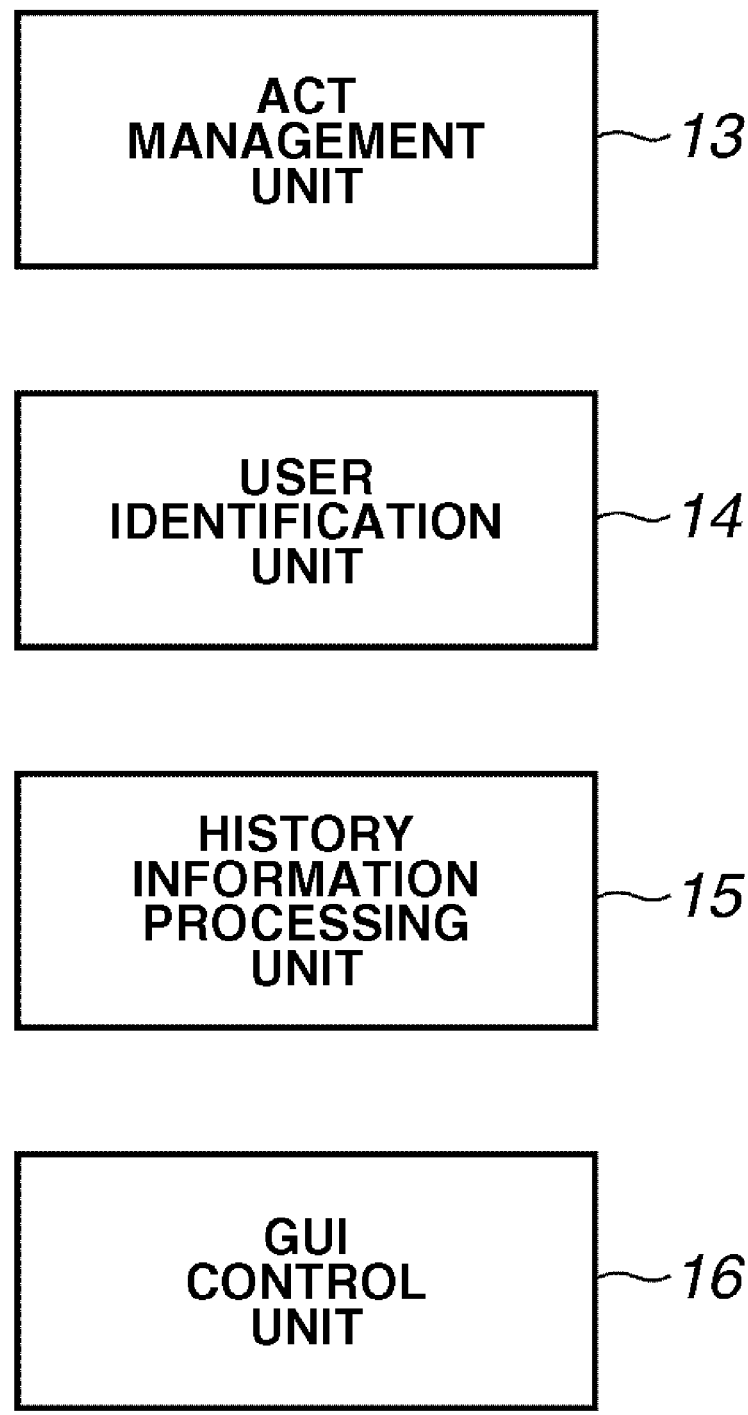
FIG. 2 illustrates an exemplary functional configuration of the copying machine illustrated in FIG. 1.

The CPU 9 executes programs stored in the memory 10, causes the processing unit to perform a computation, and sends data to each of the units. FIG. 2 illustrates an exemplary functional configuration of the copying machine 1, which is implemented by the CPU 9 executing the programs stored in the memory 10.

As illustrated in FIG. 2, the copying machine 1 includes the following functional components: an ACT management unit 13, a user identification unit 14, a history information processing unit 15, and a GUI control unit 16. The ACT (restriction information) management unit 13 manages (e.g., stores, obtains, and updates) an ACT (restriction information) of the copying machine 1, which corresponds to user information acquired at the user identification unit 14. The ACT (restriction information) management unit 13 also controls each function of the copying machine 1 according to the ACT. FIGS. 5A, 5B, 16, and 19 illustrate more specific exemplary ACTs, as described below. For example, in a case where print restriction information included in the ACT represents "deny simplex printing (one-sided printing)", the ACT management unit 13 controls the copying machine 1 to inhibit a user from designating simplex printing or to force the printer unit 8 to perform duplex printing (two-sided printing).

In a case where history information storing restriction information included in the ACT is set so that "print data includes a character string 'schedule', store history information", the ACT management unit 13 analyzes print data rasterized at the PDL rasterization unit 3 to determine whether the print data includes a character string "schedule". If the ACT management unit 13 determines that the print data includes a character string "schedule", the ACT management unit 13 instructs the history information processing unit 15 to generate history information related to printing of the print data.

The user identification unit 14 identifies a user according to user information. The user information includes identification (ID) data respectively identifying individual users and other ID data respectively identifying individual groups, divisions, and departments. The user identification unit 14 identifies such users, groups, divisions, and departments according to user information recorded on, for example, ID cards or to user information input from, for example, the panel of the display/operation unit 7.

The history information processing unit 15 generates history information according to an instruction sent from the ACT management unit 13 from print data rasterized by the PDL rasterization unit 3. Then, the history information processing unit 15 stores the generated history information in a history information temporary storage area provided in a predetermined storage region in a hard disk drive 12. At a moment set by an administrator of the copying machine 1, the history information processing unit 15 sends history information to a history information management server 26 connected to the copying machine 1 via the network 25.

The GUI control unit 16 performs a control operation related to a GUI through which an image is displayed on the panel of the liquid crystal display device of the display/operation unit 7. The GUI control unit 16 displays, e.g., an ACT setting screen illustrated in FIG. 7, which is described below, on the panel of the liquid crystal display device in response to a user's input operation. The GUI control unit 16 generates an ACT according to information set or selected via the ACT setting screen illustrated in FIG. 7. The GUI control unit 16 also stores the generated ACT in the memory 10 or the hard disk drive 12 provided in the copying machine 1. ACTs can be externally received by the copying machine 1 via the network 25 and can be temporarily stored in the memory 10.

FIG. 3 illustrates a conventional ACT. The ACT illustrated in FIG. 3 indicates that print restriction corresponding to a user ID number "012345" is that "permit color-printing" and that "deny simplex-printing". That is, the ACT illustrated in FIG. 3 indicates that when the user having the ID number "012345" prints data using the copying machine 1, color-printing is permitted, while simplex-printing is denied. Thus, if the user having the ID number "012345" instructs the copying machine 1 to perform simplex-printing of data, the copying machine 1 denies simplex-printing. Consequently, the user having the ID number "012345" cannot print the data.

FIG. 4 illustrates an exemplary ACT according to the present embodiment of the present invention. Similar to the ACT illustrated in FIG. 3, the ACT illustrated in FIG. 4 indicates that print restriction corresponding to a user ID number "012345" is that "permit color-printing" and that "deny simplex-printing".

That is, the ACT illustrated in FIG. 4 indicates that when a user having an ID number "012345" prints data using the copying machine 1, color-printing is permitted, while simplex-printing is denied. Thus, if the user having the ID number "012345" instructs the copying machine 1 to perform simplex-printing of data, the copying machine 1 denies simplex-printing. Consequently, the user having the ID number "012345" cannot print the data.

The ACT illustrated in FIG. 4 further includes history information storing restriction and history information storing impossible-time restriction in addition to the print restriction included in the ACT illustrated in FIG. 3.

The history information storing restriction is information instructing that history information is stored if a condition prescribed by the history information storing restriction (history information storing condition) is satisfied.

History information can specify printed data and is, for example, print data (print image) imaged by rasterizing PDL data, data obtained by reducing such print data in size, or all or part of character strings, images, and graphics included in print data.

The history information storing restriction illustrated in FIG. 4 instructs that history information is stored if print data includes a character string "schedule". In a case where a user having a user ID number "012345" prints print data, usually, history data is not stored. That is, the copying machine 1 neither stores history information in the hard disk drive 12, nor sends and stores history information in the history information management server 26 connected to the copying machine 1 via the network 25. Accordingly, there is no load on the device and the network 25. However, the copying machine 1 storing the ACT illustrated in FIG. 4 determines that a document (print data) to be printed including a character string "schedule" is an important one. Thus, the copying machine 1 generates history information. Consequently, a printed important document can be tracked later. Accordingly, security can be enhanced.

The history information storing impossible-time restriction is information prescribing what processing to perform in a case where history information cannot be stored.

For example, in a case where the copying machine 1 having the ACT illustrated in FIG. 4 prints a document including a character string "schedule", the copying machine 1 temporarily stores history information. At that time, for example, in a case where the hard disk drive 12 has insufficient free space, the copying machine 1 cannot store history information. The history information storing impossible-time restriction prescribes or sets what processing to perform in such a case.

According to the ACT illustrated in FIG. 4, the history information storing impossible-time restriction sets denying of printing as exemplary processing to perform in such a case. Therefore, the copying machine 1 denies printing in a case where history information cannot be stored. In such a case, a user asks an administrator of the copying machine 1 to send history information temporarily stored in the hard disk drive 12 to the history information management server 26. Thus, free space is made available in the hard disk drive 12. Then, the user instructs printing of a document once again. Alternatively, after completion of automatic transmission of history information stored in the hard disk drive 12 to the history information management server 26, the user can once again instruct printing of a document.

Figure 7:
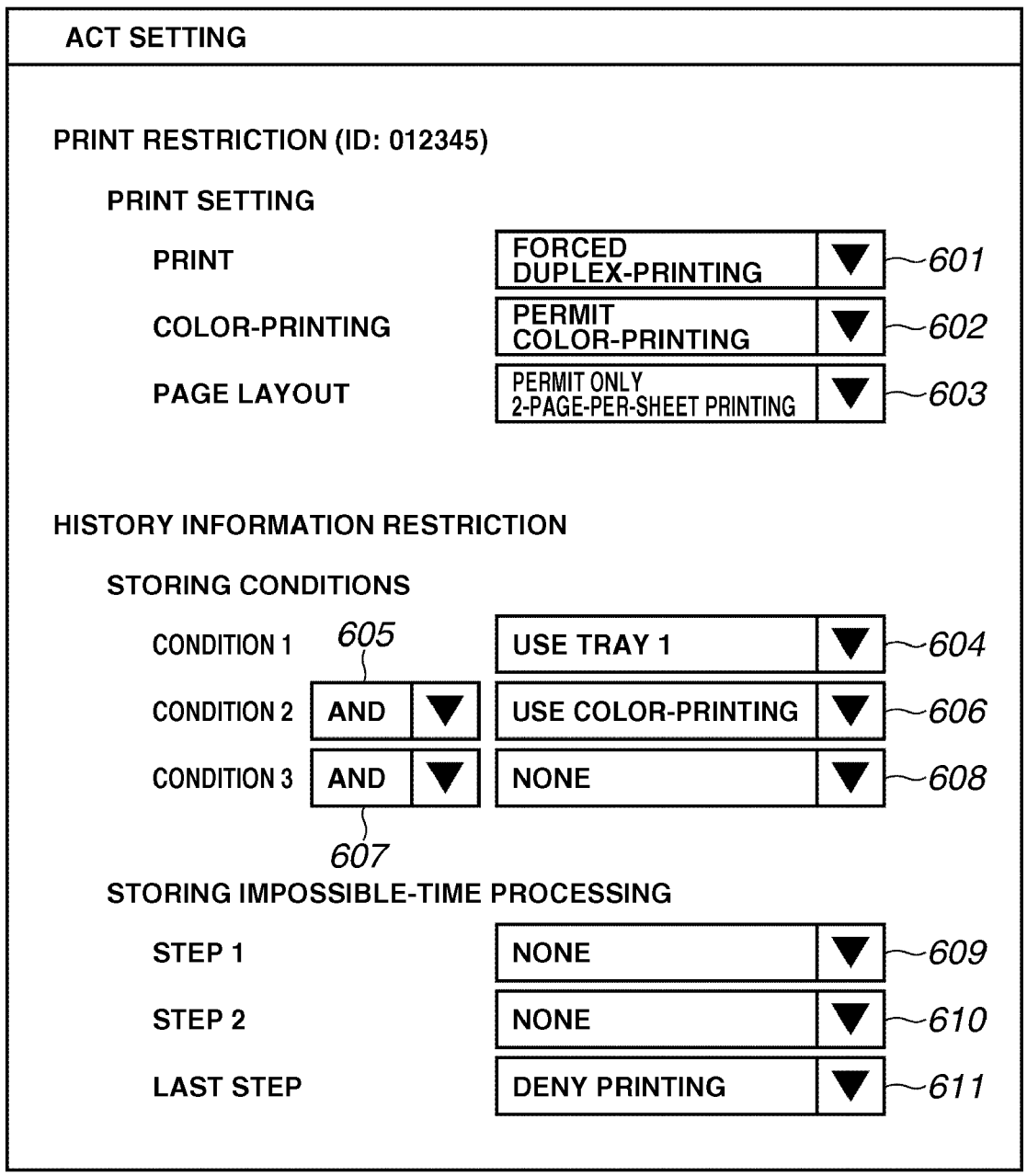
FIG. 7 illustrates an exemplary ACT setting screen to be used to set an ACT via a graphical user interface (GUI).

In a case where a user is reliable, a person having set an ACT (e.g., an administrator of the print system) can set the condition "none (permit printing)" as the history information storing impossible-time restriction through the setting screen illustrated in FIG. 7.

FIG. 5A illustrates another exemplary ACT according to the present embodiment of the present invention. According to the exemplary ACT illustrated in FIG. 5A, a history information storing restriction is that "if using tray 1, store history information". For example, in a case where an insurance certificate that is an important print sheet is placed on tray 1 and where ordinary A4 paper, A3 paper, and B4 paper are placed on trays 2 through 4, it can be set for reducing a load to store history information only in a case where an insurance certificate is printed. In this case, only when an insurance certificate is printed, history information is surely stored. This enables tracking of the printed paper. However, when an ordinary document other than an insurance certificate is printed, no history information for the ordinary document is stored.

Thus, according to the present embodiment, history information management can be performed such that history information is stored or unstored corresponding to each user ID number (or user ID information), or that history information is stored or unstored corresponding to each device (e.g., a tray) used by a user. Accordingly, both prevention of information leakage and reduction in clerical cost can be more effectively achieved by simultaneously suppressing loads on the hard disk drive 12, the network 25, and the history information management server 26 serving as devices to lower levels.

FIG. 5B illustrates still another exemplary ACT according to the present embodiment of the present invention. According to the exemplary ACT illustrated in FIG. 5B, a history information storing restriction is that "if using tray 1 and color-printing, store history information". Thus, an ACT setting person can combine any plural number of conditions with one another as a history information storing restriction via the setting screen illustrated in FIG. 7.

FIG. 6 illustrates yet another exemplary ACT according to the present embodiment of the present invention. In the exemplary ACT illustrated in FIG. 6, a department ID number is set as the ID data instead of a user ID number specifying an individual user. For example, leakage of design information is a serious problem for a designing department. Accordingly, an ACT setting person sets the history information storing restriction so that "if print data includes an image or graphics, store history information". Consequently, capability to track leaked information and to prevent occurrence of information leakage is enhanced.

FIG. 7 illustrates an exemplary ACT setting screen used to set an ACT via a GUI. A GUI component 601 is used to set (or select) print restrictions. In the case of the exemplary ACT setting screen illustrated in FIG. 7, the option "forced duplex-printing" is selected. Thus, even when simplex-printing is selected, the copying machine 1 can perform only duplex-printing.

A GUI component 602 is used to set color-printing restrictions. In the case of the exemplary ACT setting screen illustrated in FIG. 7, the option "permit color-printing" is selected. Thus, whichever of monochromatic-printing and color-printing is selected, the copying machine 1 can perform printing. For example, in a case where the option "forced monochromatic-printing" is selected, the copying machine 1 can perform only monochromatic-printing even when color-printing is designated.

A GUI component 603 is used to set page layout restrictions. In the case of the exemplary ACT setting screen illustrated in FIG. 7, the option "permit only 2-page-per-sheet printing" is selected. Thus, even when a usual 1-page-per-sheet printing is designated, the copying machine 1 can perform only 2-page-per-sheet (2 in 1) printing.

A GUI component 604 is used to set storing condition 1 of a history information restriction. In the case of the exemplary ACT setting screen illustrated in FIG. 7, the option "use tray 1" is selected. Thus, in a case where printing is performed using recording media placed on the tray 1, the copying machine 1 stores history information. However, because storing condition 2 of the second history information restriction is set, it is not determined only according to the condition 1 of the history information restriction whether history information is stored.

A GUI component 605 is used to set a related to between the conditions 1 and 2 of the history information restriction. In the case of the exemplary ACT setting screen illustrated in FIG. 7, the option "and" is selected. Thus, only in a case where both of the conditions 1 and 2 of the history information restriction are satisfied, the copying machine 1 stores history information.

A GUI component 606 is used to set the condition 2 of the history information restriction. In the case of the exemplary ACT setting screen illustrated in FIG. 7, the option "use color-printing" is selected. Thus, in a case where color-printing is designated or performed, the copying machine 1 stores history information. However, because the option "and" is selected corresponding to the related to between the conditions 1 and 2, the copying machine 1 stores history information only in a case where the tray 1 is used and where color-printing is performed.

A GUI component 607 is used to set a relationship among the conditions 1 and 2 and condition 3. In the case of the exemplary ACT setting screen illustrated in FIG. 7, the option "and" is selected. Thus, the copying machine 1 stores history information only in a case where all of the conditions 1, 2, and 3 are satisfied.

A GUI component 608 is used to set the condition 3 of the history information restriction. In the case of the exemplary ACT setting screen illustrated in FIG. 7, the option "none" is selected. Thus, there is no condition 3, so that the copying machine 1 ignores the condition 3. Consequently, the copying machine 1 stores history information only when the conditions 1 and 2 are satisfied.

A GUI component 609 is used to set processing to be first performed by the copying machine 1 at a storing impossible-time at which the copying machine 1 cannot store history information. Processing set using each of GUI components 609 or later is forcedly performed in the copying machine 1 by disregarding the above-described print setting. In the case of the exemplary ACT setting screen illustrated in FIG. 7, the option "none" is selected. Thus, the copying machine 1 ignores this setting of the processing to be first performed by the copying machine 1. However, even when the option "permit printing" is set using the GUI component 601, the copying machine 1 denies printing in a case where the option "deny printing" is set using the GUI component 609 and where the copying machine 1 cannot store history information.

A GUI component 610 is used to set processing to be second performed by the copying machine 1 at a storing impossible-time at which the copying machine 1 cannot store history information. In the case of the exemplary ACT setting screen illustrated in FIG. 7, the option "none" is selected. Thus, the copying machine 1 ignores this setting of the processing to be second performed by the copying machine 1.

A GUI component 611 is used to set processing to be finally performed by the copying machine 1 at a storing impossible-time at which the copying machine 1 cannot store history information. In the case of the exemplary ACT setting screen illustrated in FIG. 7, the option "deny printing" is selected. Thus, the copying machine 1 denies printing in a case where the copying machine 1 cannot store history information. In the case of the exemplary ACT setting screen illustrated in FIG. 7, processing to be finally performed is set in the third step of storing-impossible-time processing. However, the ACT setting person can set any number of steps to be performed before the last step of the storing-impossible-time processing.

FIG. 8 illustrates an exemplary ACT described in an XML form. However, the form of describing an ACT according to the present embodiment is not limited to the XML form. According to the exemplary ACT illustrated in FIG. 8, the user ID number of a user is "012345". The user's e-mail address is "012345@xxx.yyy".

The ACT illustrated in FIG. 8 also describes user's available functions (print restrictions) of the copying machine 1. According to the exemplary ACT illustrated in FIG. 8, a print function "PDL Print" provided by a personal computer (PC), which is referred to as "PdlPrint", is available (that is, the copying machine 1 is set to "Permit" the user to use the function "PdlPrint"). A color-printing function "ColorPrint" is available (that is, the copying machine 1 is set to "Permit" the user to print in "Color"). However, the copying machine 1 is set to "Deny" the user simplex-printing.

The exemplary ACT illustrated in FIG. 8 also describes history information storing restriction ("JobArchiveRestriction") corresponding to the user. According to the exemplary ACT illustrated in FIG. 8, the copying machine 1 is set to store history information in a case where print data includes a character string "Schedule".

The exemplary ACT illustrated in FIG. 8 also describes history information storing impossible-time restriction (history information storing impossible-state restriction) corresponding to the user. According to the exemplary ACT illustrated in FIG. 8, the copying machine 1 is set (corresponding to Attribute Value "PrintDeny") to deny the user printing.

Figure 9:
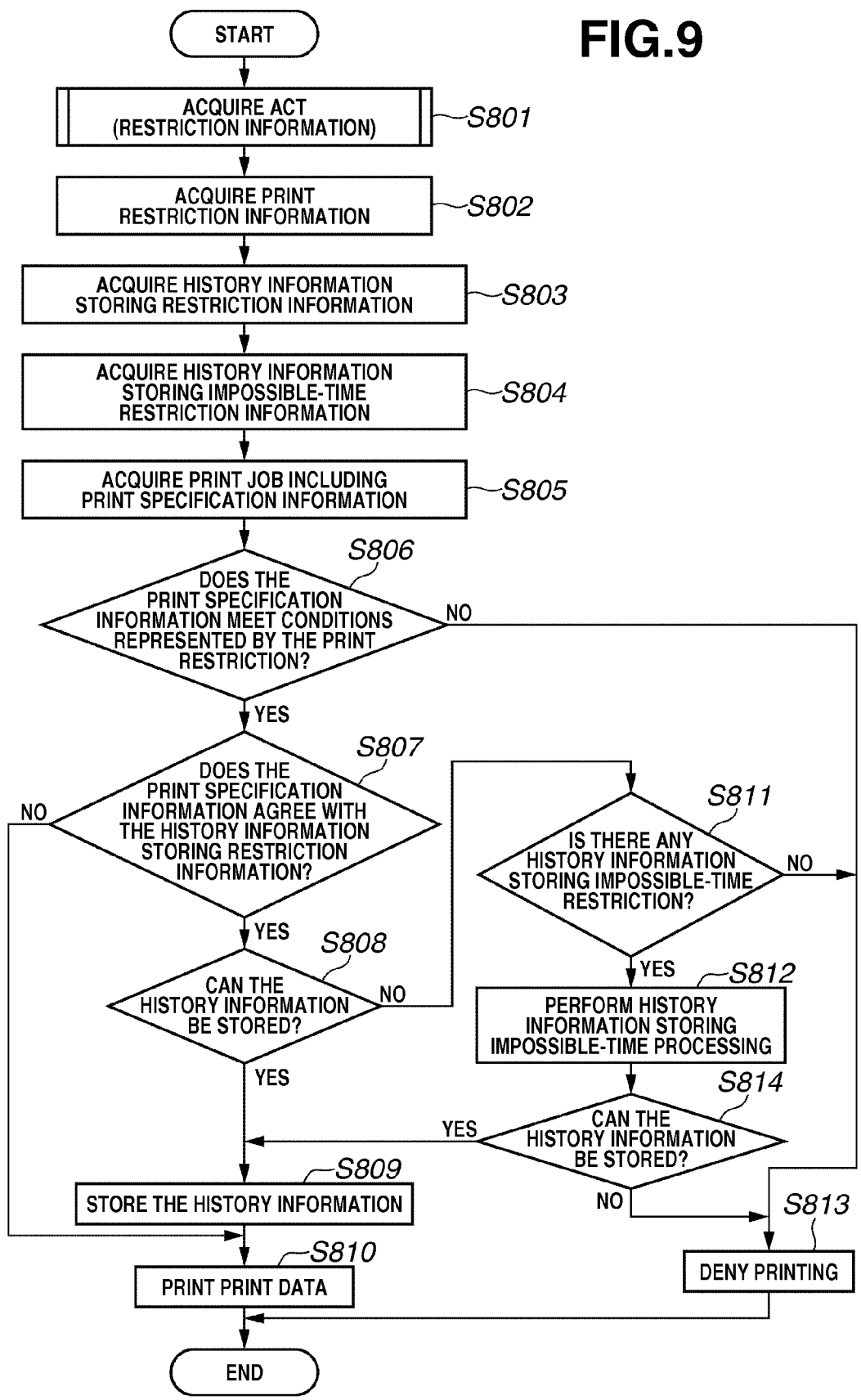
FIG. 9 is a flowchart illustrating an exemplary print process according to the first exemplary embodiment of the present invention.

FIG. 9 is a flowchart illustrating an exemplary print process according to the present embodiment of the present invention. In step S801, the ACT management unit 13 acquires an ACT (restriction information). Processing to be performed in step S801 is described below with respect to FIG. 10.

Then, in step S802, the ACT management unit 13 analyzes the ACT acquired in step S801 to acquire information on the print restriction (i.e., print restriction information) included in the ACT. For example, in a case where the exemplary ACT illustrated in FIG. 4 is acquired, the ACT management unit 13 acquires information representing the condition "permit color-printing and deny simplex-printing" as print restriction information in step S802.

Next, in step S803, the ACT management unit 13 analyzes the ACT acquired in step S801 to acquire information on the history information storing restriction (i.e., history information storing restriction information) included in the ACT. For example, in a case where the exemplary ACT illustrated in FIG. 4 is acquired, the ACT management unit 13 acquires information representing the condition "print data includes a character string 'schedule'" as history information storing restriction information in step S803.

Subsequently, in step S804, the ACT management unit 13 analyzes the ACT acquired in step S801 to acquire information on history information storing impossible-time restriction (i.e., history information storing impossible-time restriction information) included in the ACT. For example, in a case where the exemplary ACT illustrated in FIG. 4 is acquired, the ACT management unit 13 acquires information representing the condition "deny printing" as history information storing impossible-time restriction information in step S804. In a case where the ACT does not include history information storing impossible-time restriction (i.e., history information storing impossible-time restriction information), the ACT management unit 13 acquires, e.g., information representing the condition "none".

Then, in step S805, the ACT management unit 13 acquires a print job serving as an exemplary job. In a case where copying processing is performed, the ACT management unit 13 acquires data that is input from the scanner unit 6 and that is stored in the memory 10. The ACT management unit 13 also acquires information on a print specification that is input from the display/operation unit 7 and that is stored in the memory 10. In a case where FAX processing is performed, the ACT management unit 13 acquires print data and print specification information (e.g., paper size information), which are received by the modem communication unit 4 of the copying machine 1 from the FAX 22 through the public line network 24 and are stored in the memory 10. In a case where a print instruction is issued from the computer 21, the ACT management unit 13 acquires print data and print specification information by rasterizing PDL data, which is output from the computer 21 and is stored in the memory 10 via the network processing unit 2, in the PDL rasterization unit 3.

Next, in step S806, the ACT management unit 13 determines whether the print specification information obtained in step S805 meets conditions represented by the print restriction information obtained in step S802. If the ACT management unit 13 determines that the print specification information meets the conditions represented by the print restriction information (YES in step S806), the process advances to step S807. If the ACT management unit 13 determines that the print specification information does not meet the conditions represented by the print restriction information (NO in step S806), the process advances to step S813.

In step S807, the ACT management unit 13 compares the print specification information (or print data) obtained in step S805 with the history information storing restriction information obtained in step S803. Thus, the ACT management unit 13 determines whether the print specification information obtained in step S805 agrees with the history information storing restriction information obtained in step S803. If the ACT management unit 13 determines that the print specification information agrees with the history information storing restriction information (YES in step S807), the process proceeds to step S808. Conversely, if the ACT management unit 13 determines that the print specification information does not agree with the history information storing restriction information (NO in step S807), the process proceeds to step S810.

In step S808, the ACT management unit 13 determines whether history information can be stored (i.e., whether conditions related to storing of the history information are satisfied). The ACT management unit 13 determines whether the free storage capacity of the hard disk drive 12 is, for example, greater than or equal to 5% of the total storage capacity thereof. If the ACT management unit 13 determines whether the free storage capacity of the hard disk drive 12 is greater than or equal 5% of the total storage capacity thereof, the ACT management unit 13 determines that the conditions related to storing of the history information are satisfied. That is, the ACT management unit 13 determines that history information can be stored (YES in step S808). Then, the process advances to step S809. On the other hand, if the ACT management unit 13 determines that history information cannot be stored (NO in step S808), the process advances to step S811.

In step S811, the ACT management unit 13 determines whether there is a history information storing impossible-time restriction, i.e., whether the ACT includes a history information storing impossible-time restriction (i.e., history information storing impossible-time restriction information). If the ACT management unit 13 determines that there is a history information storing impossible-time restriction (YES in step S811), the process advances to step S812. Conversely, if the ACT management unit 13 determines that there is no history information storing impossible-time restriction (NO in step S811), the process advances to step S813.

In step S812, the ACT management unit 13 performs processing to be performed at a history information storing impossible-time. Next, in step S814, the ACT management unit 13 determines whether history information can be stored. If the ACT management unit 13 determines that the history information can be stored (YES in step S814), the ACT management unit 13 instructs the history information processing unit 15 to store history information. Then, the process proceeds to step S809. If the ACT management unit 13 determines that the history information cannot be stored (NO in step S814), the process proceeds to step S813.

In step S809, the history information processing unit 15 generates history information according to the instruction output from the ACT management unit 13 from print data rasterized by the PDL rasterization unit 3. The history information processing unit 15 causes the hard disk drive 12 to store the history information in a history information temporary storage area provided in a predetermined storage area in the hard disk drive 12.

In step S810, the ACT management unit 13 controls the printer unit 8 to print the print data obtained in step S805. Thus, the print process illustrated in FIG. 9 is finished.

On the other hand, in step S813, the ACT management unit 13 denies printing. Then, the print process illustrated in FIG. 9 is finished.

Figure 10:
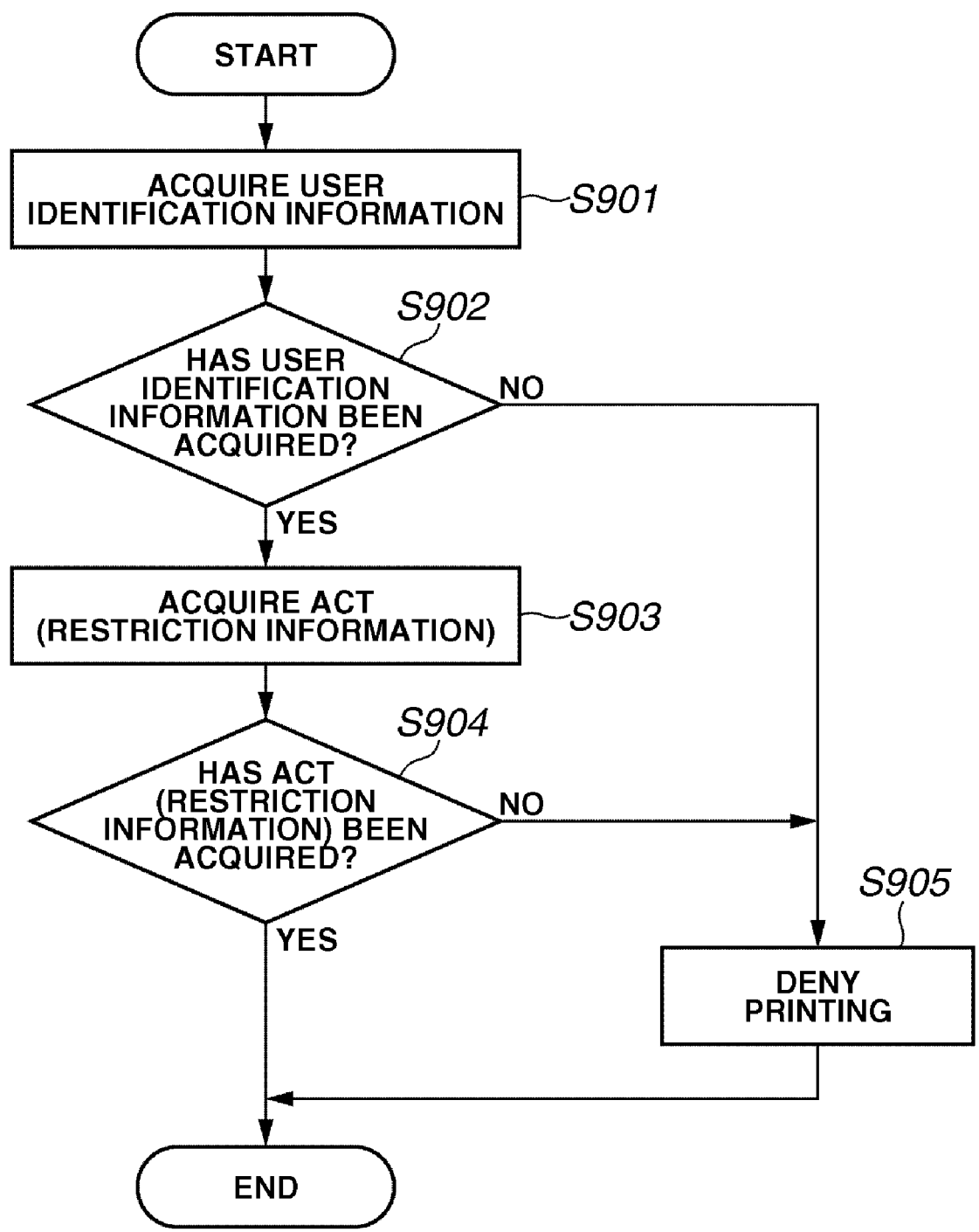
FIG. 10 is a flowchart illustrating exemplary ACT acquisition processing to be performed in the first exemplary embodiment of the present invention in step S801 illustrated in FIG. 9.

FIG. 10 is a flowchart illustrating exemplary ACT acquisition processing to be performed in the present embodiment of the present invention in step S801 illustrated in FIG. 9.

In step S901, the ACT management unit 13 acquires user identification information from the user identification unit 14. The user identification unit 14 acquires user ID information, which, for example, is read from an ID card by an ID card reader connected to the copying machine 1 as user identification information. Alternatively, the user identification unit 14 can acquire the ID information input from the display/operation unit 7 of the copying machine 1 as the user identification information. Alternatively, the user identification unit 14 can acquire user identification information, together with a print instruction, from the computer 20 or 21 connected thereto via the network 25. The present invention is not limited to the above-described methods for obtaining user ID information, and any method that would enable practice of the present invention is applicable.

In step S902, the ACT management unit 13 determines whether user identification information has been acquired. If the ACT management unit 13 determines that the user identification information has been acquired (YES in step S902), the ACT acquisition processing proceeds to step S903. Conversely, if the ACT management unit 13 determines that the user identification information has not been acquired (NO in step S902), the ACT acquisition processing proceeds to step S905.

In step S903, the ACT management unit 13 acquires an ACT from the memory 10 or the hard disk drive 12 provided in the copying machine 1 according to the user identification information acquired in step S901.

Next, in step S904, the ACT management unit 13 determines whether an ACT has been acquired. If the ACT management unit 13 determines that an ACT has been acquired (YES in step S904), the ACT management unit 13 finishes the processing illustrated in FIG. 10. Then, the print process proceeds to step S802 illustrated in FIG. 9. If the ACT management unit 13 determines that no ACT has been acquired (NO in step S904), the print process proceeds to step S905.

In step S905, the ACT management unit 13 ignores the print instruction and denies printing. That is, the ACT management unit 13 does not perform processing to be performed in step S802 and subsequent steps illustrated in FIG. 9.

According to the present embodiment, the copying machine 1 can perform a print control operation and can control, according to print data, whether to store history information. Additionally, according to the present embodiment, the copying machine 1 can control processing to be performed in a case where no history information is extracted and stored. Consequently, the present embodiment can effectively prevent information leakage and can effectively reduce clerical cost by simultaneously suppressing loads on the devices and the network to low levels.

In the foregoing description of the first exemplary embodiment, the print process in the case of acquiring the exemplary ACT illustrated in FIG. 4 has been described with reference to FIG. 9. In a second exemplary embodiment of the present invention, a print process in the case of acquiring the exemplary ACT illustrated in FIG. 5A is described with reference to FIG. 9.

In step S801, the ACT management unit 13 acquires the ACT illustrated in FIG. 5A. Then, in step S802, the ACT management unit 13 acquires information on the print restriction (i.e., print restriction information), which is included in the ACT and represents the condition "permit color-printing and deny simplex-printing".

Subsequently, in step S803, the ACT management unit 13 acquires information on the history information storing restriction (i.e., history information storing restriction information) representing the condition "if using tray, store history information". This history information storing restriction is set in a case where an important print sheet, such as a definitive security or an insurance certificate, is placed on the tray 1.

Next, in step S804, the ACT management unit 13 acquires information on a history information storing impossible-time restriction (i.e., history information storing impossible-time restriction information) representing the condition "deny printing".

Processing to be performed in step S805 and subsequent steps is similar to that in the first embodiment, and therefore a detailed description is omitted herein. Thus, according to the present embodiment, the copying machine 1 can perform a print control operation and can control, according to device information, whether to store history information. Additionally, according to the present embodiment, the copying machine 1 can control processing to be performed in a case where no history information is extracted and stored. Consequently, the present embodiment can prevent information leakage and reduce clerical cost by simultaneously suppressing loads on the devices and the network to low levels.

According to a third exemplary embodiment of the present invention, a driver of the computer 21 acquires an ACT from a ticket granting server. The driver sends information on a print job, which includes the ACT and PDL data, to the copying machine 1 (e.g., a multifunction peripheral (MFP) 1003 illustrated in FIG. 13).

Figure 11:
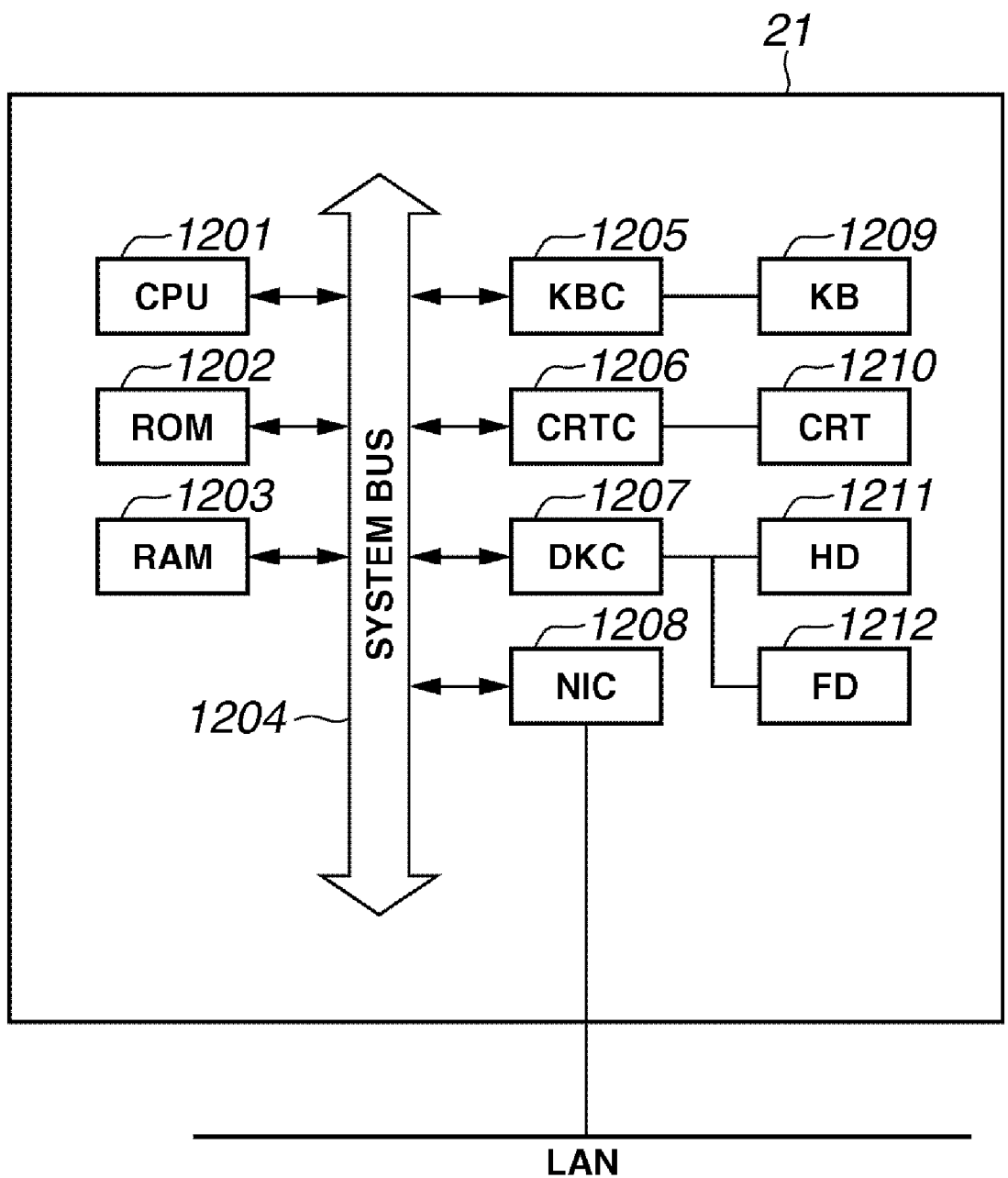
FIG. 11 illustrates an exemplary configuration of hardware of a computer illustrated in FIG. 1.

FIG. 11 illustrates an exemplary configuration of hardware of the computer 21. As illustrated in FIG. 11, the computer 21 includes a central processing unit (CPU) 1201, a read-only memory (ROM) 1202, a random access memory (RAM) 1203, and a keyboard controller (KBC) 1205 for a keyboard (KB) 1209. The computer 21 also includes a cathode ray tube (CRT) controller (CRTC) 1206 for a CRT display device 1210 serving as a display unit, and a disk controller (DKC) 1207 for a hard disk (HD) 1211 and a floppy disk (FD) 1212. The computer 21 further includes a network interface controller (NIC) 1208 for connecting the computer 21 to a network (e.g., a local area network (LAN)). These hardware devices are connected to one another via a system bus 1204 to be able to communicate with one another.

Figure 13:
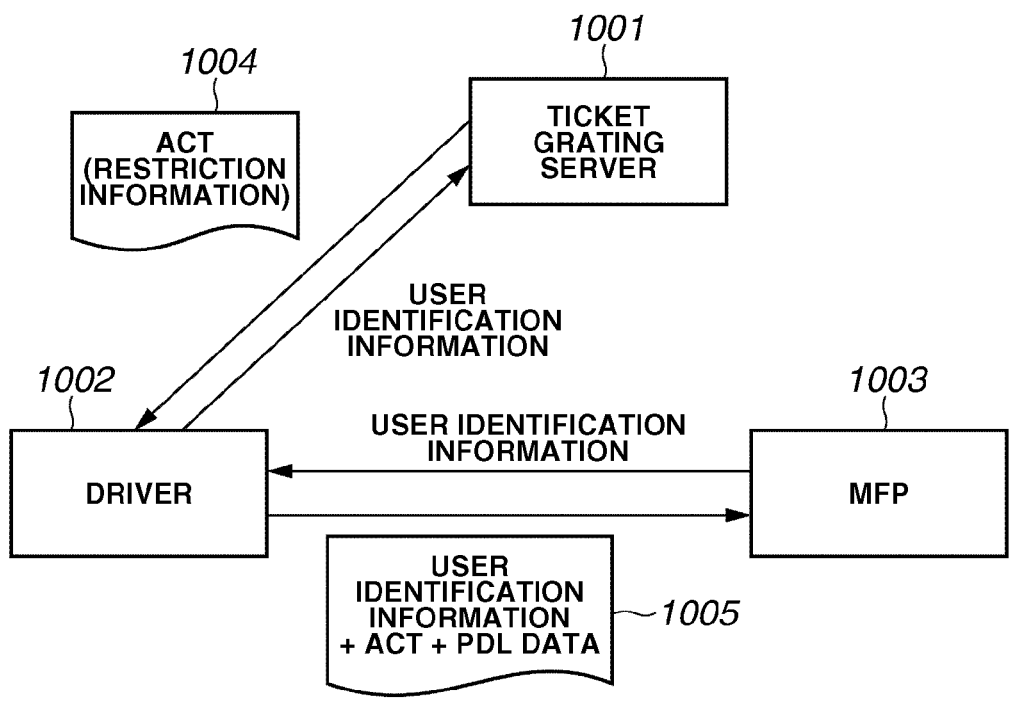
FIG. 13 illustrates an exemplary process to be performed by an exemplary print system according to an exemplary embodiment of the present invention.

The CPU 1201 administratively controls component units connected to the system bus 1204 by executing programs (e.g., a program corresponding to a driver 1002 illustrated in FIG. 13) recorded in the ROM 1202 or the HD 1211 or programs supplied from the FD 1212.

That is, the CPU 1201 controls the component units to implement a control operation according to the present embodiment by reading the program corresponding to the driver 1002 from the ROM 1202, the HD 1211, or the FD 1212 and by executing the read program.

The RAM 1203 functions a main memory or a work area for the CPU 1201. The KBC 1205 controls instructions input from the KB 1209 or a pointing device (not illustrated).

The CRTC 1206 controls each display in the CRT 1210. The DKC 1207 controls accesses to the HDD 1211 and the FD 1212, which store a boot program, various application programs, edit files, user files, network management programs, and a program corresponding to the driver 1002. The NIC 1208 bidirectionally exchanges data with devices or systems provided on the network.

Figure 12:
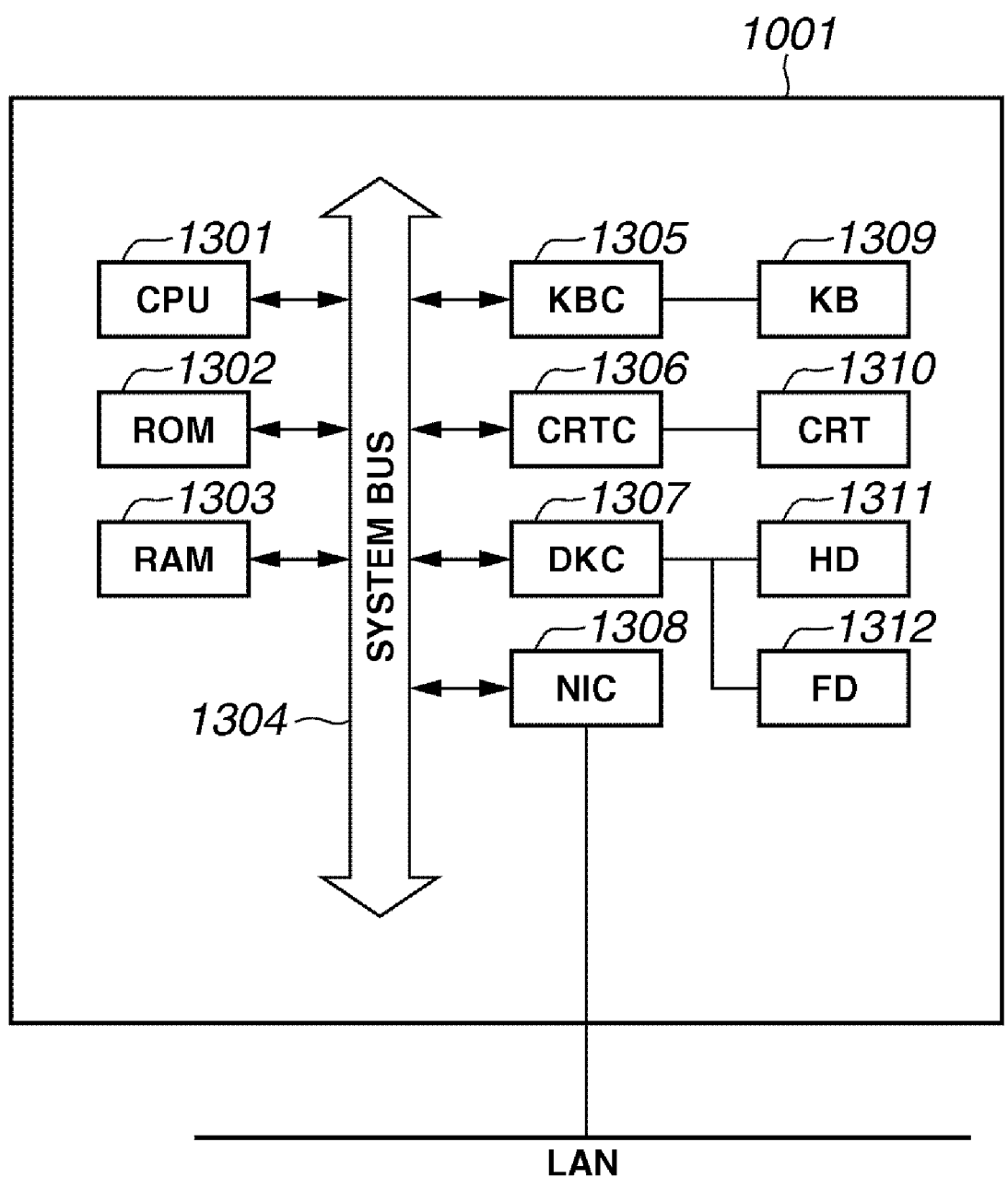
FIG. 12 illustrates an exemplary configuration of a ticket granting server serving as an exemplary restriction information issuing apparatus.

FIG. 12 illustrates an exemplary hardware configuration of a ticket granting server 1001 illustrated in FIG. 13. As illustrated in FIG. 12, the ticket granting server 1001 includes a CPU 1301, a ROM 1302, a RAM 1303, and a KBC 1305 for a KB 1309. The ticket granting server 1001 also includes a CRTC 1306 for a CRT display unit 1310 serving as a display unit, and a DKC 1307 for an HD 1311 and an FD 1312. The ticket granting server 1001 further includes an NIC 1308 for connecting the server 1001 to a network (e.g., a LAN). These hardware devices are connected to one another via a system bus 1304 to be able to communicate with one another.

The CPU 1301 administratively controls component units connected to the system bus 1304 by executing programs (e.g., a program corresponding to a GUI control unit (not illustrated) recorded in the ROM 1302 or the HD 1311 or programs supplied from the FD 1312.

That is, the CPU 1301 controls the component units to implement a control operation according to the present embodiment by reading the program corresponding to the driver 1002 from the ROM 1302, the HD 1311, or the FD 1312 and by executing the read program.

The RAM 1303 functions a main memory or a work area for the CPU 1301. The KBC 1305 controls instructions input from the KB 1309 or a pointing device (not illustrated).

The CRTC 1306 controls each display in the CRT 1310. The DKC 1307 controls accesses to the HDD 1311 and the FD 1312, which store a boot program, various application programs, edit files, user files, network management programs, and a program corresponding to the GUI control unit. The NIC 1308 bidirectionally exchanges data with devices or systems provided on the network.

FIG. 13 illustrates an exemplary process to be performed by an exemplary print system according to an exemplary embodiment of the present invention. The MFP 1003 (i.e., the copying machine 1) sends user identification information to the driver 1002 of the computer 21. When receiving the user identification information from the MFP 1003, the driver 1002 of the computer 21 sends the received user identification information to the ticket granting server 1001.

When receiving the user identification information from the drier 1002 of the computer 21, the ticket granting server 1001 causes the CRT 1310 to display a setting screen illustrated in FIG. 7. Then, the ticket granting server 1001 generates an ACT 1004 in response to a setting operation performed (or a setting instruction input) by an ACT setting person. The ticket granting server 1001 causes the RAM 1303 to store the generated ACT 1004, and sends the ACT 1004 stored in the RAM 1303 to the driver 1002 of the computer 21.

Figure 14:
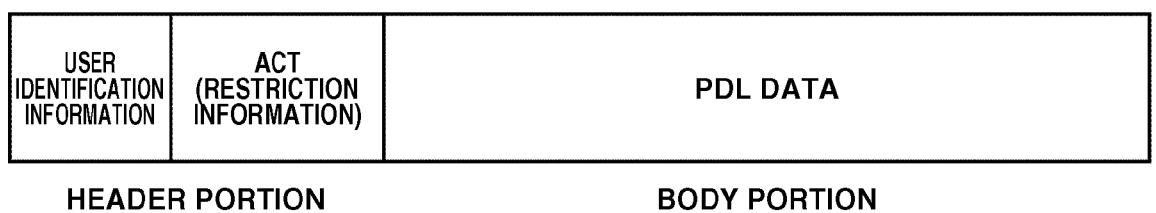
FIG. 14 illustrates an exemplary print job according to an exemplary embodiment of the present invention.

The ACT 1004 sent from the ticket granting server 1001 is received by the driver 1002 of the computer 21 (or by the computer 21). Then, the driver 1002 of the computer 21 generates a print job 1005, which is illustrated in FIG. 14, and includes the user identification information, the ACT 1004, and the PDL data. Subsequently, the driver 1002 of the computer 21 sends the generated print job 1005 to the MFP 1003.

FIG. 14 illustrates an exemplary print job. As illustrated in FIG. 14, the print job includes user identification information and an ACT, which are set in a header portion thereof, and also includes PDL data set in a body portion thereof. When receiving the print job 1005 from the driver 1002 of the computer 21, the MFP 1003 performs print processing described in the foregoing description of the above-described exemplary embodiments according to the ACT 1004 and the PDL data included in the print job 1005.

Figure 15:
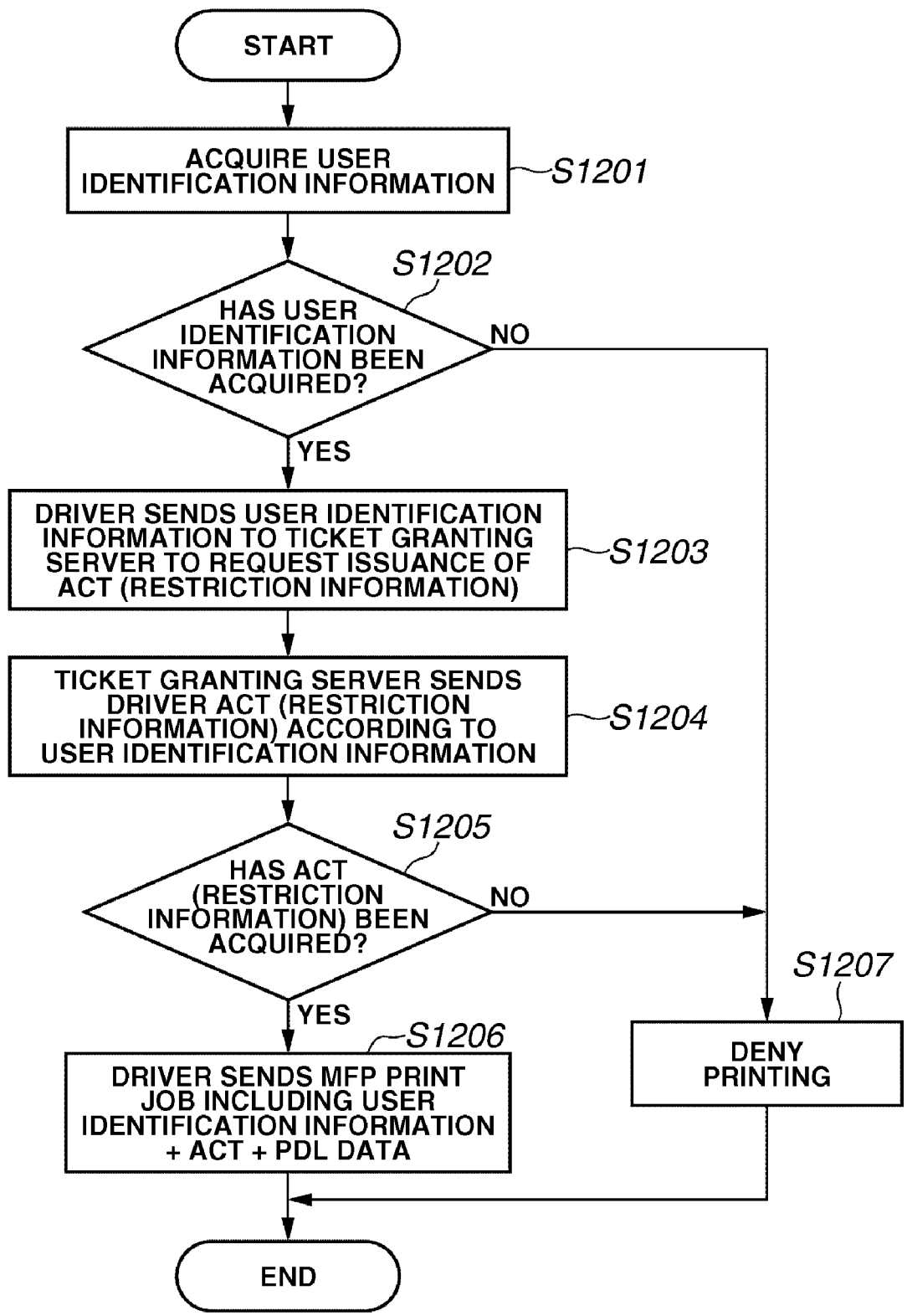
FIG. 15 is a flowchart illustrating exemplary ACT acquisition processing to be performed in a third exemplary embodiment of the present invention in step S801 illustrated in FIG. 9.

FIG. 15 is a flowchart illustrating exemplary ACT acquisition processing to be performed in the third exemplary embodiment of the present invention in step S801 illustrated in FIG. 9. In step S1201, the ACT management unit 13 acquires user identification information from the user identification unit 14. The user identification unit 14 acquires information representing a user ID number, for example, by an ID card reader connected to the copying machine 1 reading the user identification information from an ID card, as user identification information. Alternatively, the user identification unit 14 can acquire information representing a user ID number, which is input from the display/operation unit 7 of the copying machine 1, as user identification information. Alternatively, the user identification unit 14 can acquire user identification information from the computer 20 or 21 connected thereto via the network 25, together with a print instruction. The present invention is not limited to the above-described methods for obtaining user identification information, and any method that would enable practice of the present invention is applicable.

In step S1202, the ACT management unit 13 determines whether user identification information has been acquired. If the ACT management unit 13 determines that user identification information has been acquired (YES in step S1202), the processing proceeds to step S1203. Conversely, if the ACT management unit 13 determines that user identification information has not been acquired (NO in step S1202), the processing proceeds to step S1207.

In step S1203, the ACT management unit 13 sends user identification information to the driver 1002 of the computer 21. When receiving the user identification information, the driver 1002 of the computer 21 sends the user identification information to the ticket granting server 1001 and requests the ticket granting server 1001 to grant an ACT and to send an ACT to the driver 1002 of the computer 21.

In step S1204, the ticket granting server 1001 generates an ACT 1004 in response to a setting operation performed (or to a setting instruction issued) by the ACT setting person. Then, the ticket granting server 1001 sends the generated ACT 1004 to the driver 1002 of the computer 21.

In step S1205, the driver 1002 of the computer 21 determines whether an ACT 1004 has been acquired from the ticket granting server 1001. If the driver 1002 of the computer 21 determines that the ACT 1004 has been acquired (YES in step S1205), the processing proceeds to step S1206. Conversely, if the driver 1002 of the computer 21 determines that the ACT 1004 has not been acquired (NO in step S1205), the processing proceeds to step S1207.

In step S1206, the driver 1002 of the computer 21 generates a print job 1005 that includes the user identification information, the ACT 1004, and the PDL data. Then, the driver 1002 of the computer 21 sends the generated print job 1005 to the MFP 1003.

In step S1207, the ACT management unit 13 having determined that the user identification information has not been acquired ignores the print instruction and denies printing. That is, the ACT management unit 13 does not perform processing to be performed in step S802 and subsequent steps illustrated in FIG. 9. Similarly, in step S1207, the ACT management unit 13 ignores the print instruction and denies printing when receiving from the driver 1002 of the computer 21 information indicating that the ACT 1004 has not been acquired, after the driver 1002 determines that the ACT 1004 has not been acquired. Thus, the ACT management unit 13 does not perform processing to be performed in step S802 and subsequent steps illustrated in FIG. 9.

As described above, in a case where the computer 21 serving as a client PC acquires an ACT from the ticket granting server 1001 and instructs the MFP 1003 (e.g., the copying machine 1) to perform printing, the present embodiment includes advantages similar to those of the above-described embodiments.

According to a fourth exemplary embodiment of the present invention, a copying machine 1 performs the following processing in a case where an ACT includes a plurality of history information storing impossible-time restrictions, more specifically, in a case where a plurality of history information storing impossible-time restrictions included in the ACT are set so that existing history information is processed when the history information cannot be stored without being processed. The processing to be performed by the present embodiment is similar to that illustrated in FIGS. 9 and 10 according to the first embodiment. Therefore, the differences between the processing performed by the present embodiment and that illustrated in FIGS. 9 and 10 according to the first embodiment are described below.

FIG. 16 illustrates an exemplary ACT according to the present embodiment of the present invention. The exemplary ACT illustrated in FIG. 16 describes the history information storing impossible-time restrictions imposed on processing (hereunder sometimes referred to as history information storing impossible-time processing) that is performed in a case where history information cannot be stored, and that has three stages respectively corresponding to step 1, step 2, and the last step (i.e., the final measure). That is, the ACT illustrated in FIG. 16 includes the history information storing impossible-time restrictions in a stepwise fashion.

The history information storing impossible-time processing is performed in step S812 illustrated in FIG. 9 according to the first embodiment of the present invention.

In step S812, first, the ACT management unit 13 having acquired the ACT illustrated in FIG. 16 performs processing corresponding to step 1 to "reduce a file size by sharing drawing object detected according to stored history information".

The ACT management unit 13 (or the history information processing unit 15) analyzes each history information temporarily stored in the hard disk drive 12. If there is a sharable drawing object, the file size of a history information file is reduced by sharing the detected drawing object.

Figure 17A:
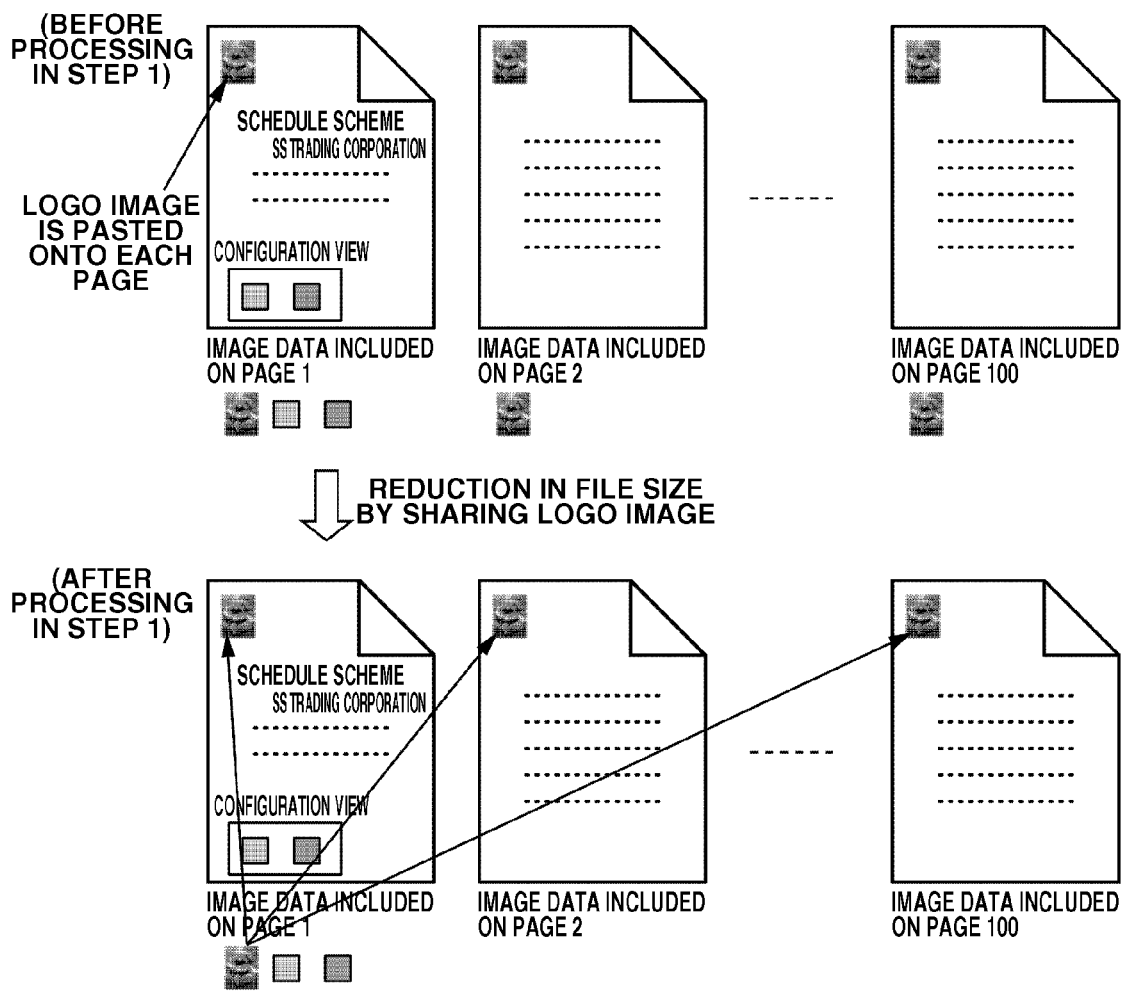
FIG. 17A illustrates exemplary processing to be performed in the fourth exemplary embodiment of the present invention in a case where a file size of a history information file is reduced by sharing a drawing object.
Figure 17B:
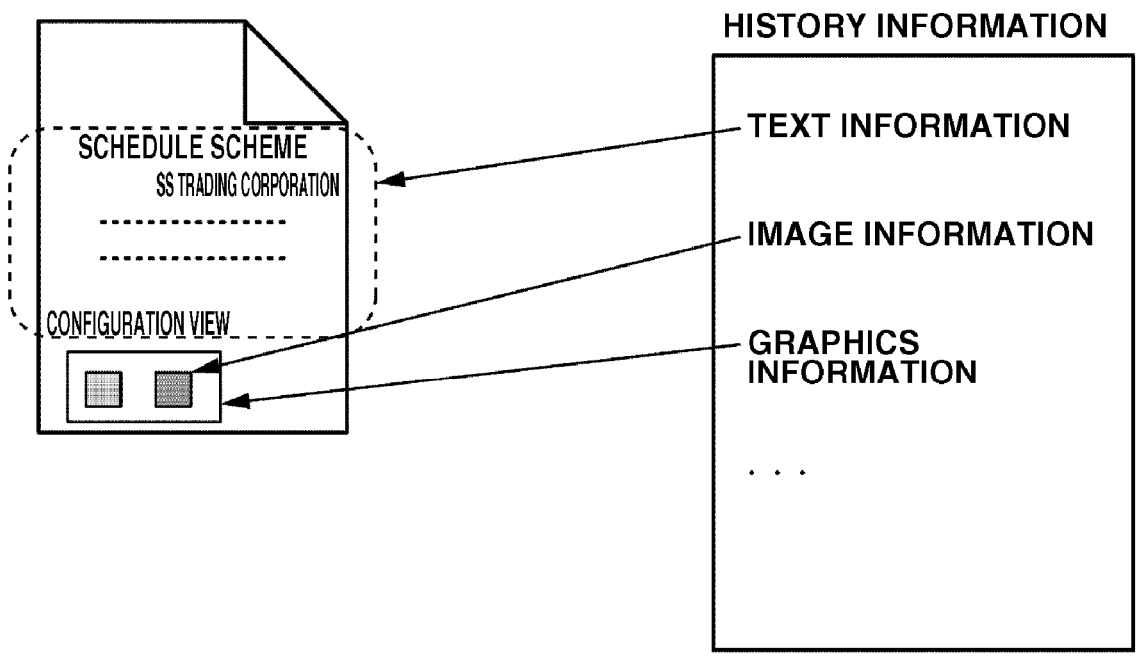
FIG. 17B illustrates exemplary history information in a file having a file size to be reduced by the processing illustrated in FIG. 17A.

FIG. 17A illustrates exemplary processing performed in the present embodiment of the present invention in a case where the file size of a history information file is reduced by sharing a drawing object. In a state before the processing corresponding to step 1 is performed in the case where history information cannot be stored, image data representing the same logo image (i.e., a drawing object) is attached to each page of the history information file. It is assumed that history information files are managed by separating drawing objects represented by history information from one another, similarly to a Portable Document Format (PDF) file managed by classifying information included in the PDF file into character-string information (i.e., text information), image information (or image data), and graphics information. FIG. 17B illustrates exemplary history information.

Referring back to FIG. 17A, it is seen from FIG. 17A that after the processing corresponding to step 1 (i.e., sharing the image data representing the same logo image (corresponding to the same drawing object) in the case where history information cannot be stored, only one image data representing the logo image is stored, while 100 pieces of image data representing the same logo image are stored before the processing corresponding to step 1.

In the case illustrated in FIG. 17A, the ACT management unit 13 performs sharing of the image data representing the same logo image only within each history information (or each history information file). However, the ACT management unit 13 can perform reduction in the file size of the history information file by sharing the image data representing the same logo image over all history information stored in the hard disk drive 12. In a case where such processing is performed, the ACT management unit 13 (or the history information processing unit 15) causes the hard disk drive 12 to store the image data representing the shared logo image as a common image file. Then, the ACT management unit 13 (or the history information processing unit 15) sets history information such that the image data representing the logo image is linked from the history information and can be referred to therefrom. Consequently, the free storage capacity of the hard disk drive 12 can be further increased by such processing. Thus, the hard disk drive 12 is enabled to store history information. At that time, the ACT management unit 13 instructs the history information processing unit 15 to store history information. Then, the processing proceeds to step S809.

In a case where the hard disk drive 12 cannot assure a free storage capacity sufficient for storing new history information even when the processing corresponding to step 1 is performed, the ACT management unit 13 returns to step S812, in which the ACT management unit 13 performs processing corresponding to step 2 according to information set in the ACT.

Figure 18:
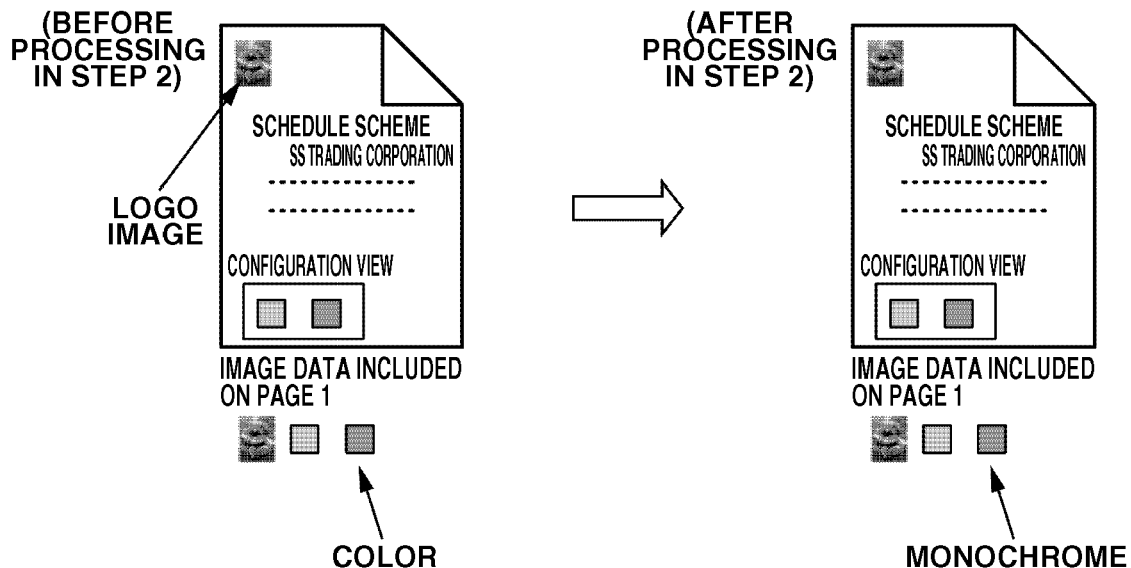
FIG. 18 illustrates exemplary processing to be performed in the fourth exemplary embodiment of the present invention in a case where a file size of a history information file is reduced by changing multicolor representation of a drawing object detected according to stored history information to monochromatic representation thereof.

FIG. 18 illustrates exemplary processing to be performed in the present embodiment of the present invention in a case where a file size of a history information file is reduced by changing multicolor representation of a drawing object detected according to stored history information to monochromatic representation thereof. A major cause for a large file size of a history information file is color information. The ACT management unit 13 (or the history information processing unit 15) converts color image data into monochromatic image data according to the information set in the ACT. Consequently, the free storage capacity of the hard disk drive 12 can be increased.

According to the processing illustrated in FIG. 18, all color image data, such as the data representing the logo image, included in history information is converted into monochromatic image data after processing corresponding to step 2 is performed by the ACD management unit 13 (or the history information processing unit 15).

In a case where the hard disk drive 12 cannot assure a free storage capacity sufficient for storing new history information even when the processing corresponding to step 2 is performed, the ACT management unit 13 returns to step S812, in which the ACT management unit 13 performs processing corresponding to the last step according to information set in the ACT. The number of steps to be performed before the last step of the storing-impossible-time processing is performed is not limited to two. The ACT setting person can set any number of steps to be performed before the last step of the storing-impossible-time processing is performed.

According to the present embodiment, the processing corresponding to the last step is to "deny printing". Thus, the ACT management unit 13 denies printing. Consequently, the print process illustrated in FIG. 9 is finished, similarly to the first embodiment of the present invention.

As described above, according to the present embodiment, existing history information is processed in a stepwise fashion according to information set in an ACT so that new history information can be stored. Consequently, the present embodiment addresses the issue where, because history information cannot be stored in the hard disk drive due to deficiency of the free storage capacity thereof, a conventional copying machine is not able to store new history information. The present embodiment of the present invention can effectively prevent information leakage.

According to a fifth exemplary embodiment of the present invention, a copying machine 1 performs the following processing in a case where an ACT includes a plurality of history information storing impossible-time restrictions, more specifically, in a case where a plurality of history information storing impossible-time restrictions included in the ACT are set so that new history information is processed when the history information cannot be stored.

The processing performed by the present embodiment is similar to that illustrated in FIGS. 9 and 10 according to the first embodiment. Accordingly, differences between the processing performed by the present embodiment and that illustrated in FIGS. 9 and 10 according to the first embodiment are described below.

FIG. 19 illustrates an exemplary ACT according to the present embodiment of the present invention. The exemplary ACT illustrated in FIG. 19 describes the history information storing impossible-time restrictions imposed on processing that is performed in a case where history information cannot be stored, and that has two stages respectively correspond to step 1 and the last step (i.e., the final measure).

The history information storing impossible-time processing is performed in step S812 illustrated in FIG. 9 according to the first embodiment of the present invention.

In step S812, first, the ACT management unit 13 having acquired the ACT illustrated in FIG. 19 performs processing corresponding to step 1 to "reduce a file size by sharing drawing object detected according to new history information".

This processing is to perform sharing of a drawing object on new history information, similar to the fourth embodiment illustrated in FIG. 17A. In a case where such processing enables the hard disk drive 12 to store history information, the ACT management unit 13 instructs the history information processing unit 15 to store history information. Then, the processing proceeds to step S809.

In a case where the hard disk drive 12 cannot assure a free storage capacity sufficient for storing new history information even when the processing corresponding to step 1 is performed, the ACT management unit 13 returns to step S812, in which the ACT management unit 13 performs processing corresponding to the last step according to information set in the ACT.

According to the present embodiment, the processing corresponding to the last step is to "deny printing". Thus, the ACT management unit 13 denies printing. Consequently, the print process illustrated in FIG. 9 is finished, similar to the first embodiment of the present invention.

As described above, according to the present embodiment, new history information is processed in a stepwise fashion according to information set in an ACT so that the new history information can be stored. Consequently, the present embodiment addresses the issue where, because new history information cannot be stored in the hard disk drive due to deficiency of the free storage capacity thereof, a conventional copying machine is not able to store new history information. The present embodiment of the present invention can effectively prevent information leakage.

Aspects of the present invention are achieved as follows. That is, a recording medium (or a storage medium), on which program code capable of implementing the functions of the above-described exemplary embodiments is recorded, is supplied to a system or apparatus. Then, the program code stored in the storage medium is read and executed by a central processing unit (CPU or micro-processing unit (MPU)) of the system or apparatus. In this case, the program code itself read from the storage medium implements the functions of the above-described embodiments. The storage medium, on which the program code is recorded, constitutes the present invention.

The functions of the above-described embodiments can be implemented by executing the read program code by the central processing unit and by performing part or all of actual processing operations using an operating system (OS) running on a system or apparatus according to an instruction represented by the program code.

The functions of the above-described embodiments can be implemented by performing part or all of actual processing operations using a CPU or the like provided on a function expansion board or a function expansion unit, which is inserted into a system or connected to an apparatus, after the program code read from the recording medium is written to a memory of the expansion board or unit.

In a case where the present invention is applied to a recording medium, a program code corresponding to the above-described flowchart is stored in the recording medium.

According to the above-described exemplary embodiments, print restriction processing in the case of disabling the storage of history information can flexibly and appropriately be performed. Also, prevention of information leakage and reduction in clerical cost can be more effectively achieved by simultaneously reducing loads on a system and a network to low levels.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-045521 filed Feb. 26, 2007, which is hereby incorporated by reference herein in its entirety.

What is claimed is:

1. A print processing execution apparatus comprising:
a central processing unit;
a memory;
a restriction information acquisition unit configured to acquire restriction information including processing information indicating processing to be executed if it is not possible to store history information capable of specifying data printed by a user in the print processing execution apparatus;
a print processing execution unit configured to execute print processing based on a job;
a determination unit configured to determine whether a condition for storing history information related to the job is satisfied;
a storage control unit configured to store the history information in a storage unit if the determination unit determines that the condition for storing history information is satisfied and it is possible to store the history information related to the job; and
a processing unit configured to execute processing based on the processing information if the determination unit determines that the condition for storing history information is satisfied and it is not possible to store the history information related to the job,
wherein the print processing execution unit executes print processing without storing the history information related to the job if the determination unit determines that the condition for storing information is not satisfied.

2. The print processing execution apparatus according to claim 1, wherein the restriction information further includes a history information storing condition, which needs to be satisfied so as to store the history information, and
wherein, if the job meets the history information storing condition, the determination unit determines that the condition for storing history information related to the job is satisfied.

3. The print processing execution apparatus according to claim 1, wherein the restriction information includes a plurality of processing information, and
wherein, if the determination unit determines that the condition for storing history information is not satisfied, the processing unit executes processing in a stepwise fashion based on the plurality of processing information until the determination unit determines that the condition for storing history information is satisfied.

4. The print processing execution apparatus according to claim 1, wherein, if the processing information indicates denying printing, the processing unit denies execution of print processing in the print processing execution unit.

5. The print processing execution apparatus according to claim 1, further comprising a restriction information setting unit configured to set the restriction information.

6. A method for printing, the method comprising:
acquiring restriction information including processing information indicating processing to be executed if it is not possible to store history information capable of specifying data printed by a user in the print processing execution apparatus;
executing print processing based on a job;
determining whether a condition for storing history information related to the job is satisfied;
storing the history information if it is determined that the condition for storing history information is satisfied and it is possible to store the history information related to the job; and
executing processing based on the processing information included in the restriction information if it is determined that the condition for storing history information is satisfied and it is not possible to store the history information related to the job, wherein the print processing execution unit executes print processing without storing the history information related to the job if the determination unit determines that the condition for storing information is not satisfied.

7. The method according to claim 6, wherein the restriction information further includes a history information storing condition, which needs to be satisfied so as to store the history information, and wherein the method further comprises, if the job meets the history information storing condition, determining that the condition for storing history information related to the job is satisfied.

8. The method according to claim 6, wherein the restriction information includes a plurality of processing information, and wherein the method further comprises, if it is determined that the condition for storing history information is not satisfied, executing processing in a stepwise fashion based on the plurality of processing information until it is determined that the condition for storing history information is satisfied.

9. The method according to claim 6, further comprising denying execution of the print processing if the processing information indicates denying printing.

10. The method according to claim 6, further comprising setting the restriction information.

11. A non-transitory computer-readable storage medium storing computer-executable instructions, which when loaded into a computer and executed cause the computer to perform the method of claim 6.

* * * * *